United States Patent [19]

Thomas

[11] 4,332,443

[45] Jun. 1, 1982

[54] CONTACT LENSES

[76] Inventor: Penrhyn F. Thomas, 5 N. Arm Rd., Middle Cove, New South Wales, 2068, Australia

[21] Appl. No.: 231,544

[22] Filed: Feb. 4, 1981

Related U.S. Application Data

[63] Continuation of Ser. No. 24,787, Mar. 29, 1979, abandoned.

[51] Int. Cl.³ .............................................. G02C 7/04
[52] U.S. Cl. ............................................... 351/160 H
[58] Field of Search ................... 351/160 R, 162, 176

[56] References Cited

U.S. PATENT DOCUMENTS

| | | | |
|---|---|---|---|
| 1,782,331 | 11/1930 | Wilhelm | 351/160 R |
| 3,102,157 | 8/1963 | Gambler | 351/160 R |
| 3,246,941 | 4/1966 | Moss | 351/160 R |
| 4,095,878 | 6/1978 | Fanti | 351/161 |

Primary Examiner—F. L. Evans
Assistant Examiner—Scott J. Sugarman
Attorney, Agent, or Firm—Curtis Ailes

[57] ABSTRACT

A corneal lens has a substantially circular optical correction zone and one or more lugs extending therefrom for engagement with depressions on the sclera of the eyeball existing between the four ocular muscles attached thereto.

4 Claims, 6 Drawing Figures

CONTACT LENSES

This application is a continuation, of application Ser. No. 024,787, filed Mar. 29, 1979, now abandoned.

The invention relates to improvements in contact lenses and more particularly to the improvement of contact lenses made from soft hydrophilic plastics.

The development of soft hydrophilic plastics contact lenses has made it possible for the wearer to wear the lenses for lengthy periods of time without any irritation of the eye. However, a major difficulty has been experienced with such lenses as, owing to the flexibility of the plastic lens, the lens tends to conform to the corneal shape and thereby transmits any corneal astigmatism through the lens to its outer surface. Thus, for example, a circular spherical hydrophilic lens of the correct fitting parameters, when placed on an eye with a corneal astigmatism, will tend to conform to this astigmatic shape of the cornea and thus transmits this astigmatism to the anterior surface of the lens resulting in ineffective visual correction.

Various attempts have been made to modify the lens design by providing a lens with a prism ballast or by truncation and by combining therewith an equivalent astigmatic surface which may be on the posterior or anterior surface of the lens.

The prism ballast and/or the truncation, is then located at a required axis so as to locate the axis of the astigmatic surface in such a manner that the resultant cylinder of the cornea is neutralised.

Although optimum visual correction can be achieved in this manner, difficulties arise in keeping the lens located in the proper position. Not only may the action of the lids in blinking rotate the lens off the desired axis, but also the lens may fail to remain located in the required position when the head is tilted due to the gravity effect on the base of the locating ballast prism. On the other hand, it is not possible to lock the circular conventional hydrophilic lens in any predetermined axis, whilst maintaining an adequate tear flow beneath the lens at all times.

It is an object of this invention to overcome these problems and to assure the position of the lens on the cornea irrespective of movements of the eye lids and movements of the head. To achieve this object, the invention takes advantage of the variation in scleral shape caused by the ocular muscles attached to the external surface of the eye ball.

Four ocular muscles are located in different directions on the eye ball and are generally defined as superior and inferior muscles attached to the eye ball in vertical opposition to each other and nasal and temporal muscles sometimes also referred to as lateral and medial muscles and attached horizontally opposed to each other. These muscles, which are inserted in the sclera of the eye ball, form between them depressions which according to the invention are used to locate the contact lens on the cornea. The objective of the invention is therefore achieved by providing a contact lens having a substantially circular optic and at least one lug or flange extending therefrom, said lug being adapted to engage one of the depressions on the eye ball formed between the ocular muscles attached to the sclera of the eye. The lens itself can then be provided with the required astigmatic anterior and/or posterior surface to correct any residual astigmatism due to corneal and/or optical surfaces posterior to the cornea to provide optium correction of the ametropia.

By adapting the lug or flange to the depression on the cornea to which the lens is fitted, the position of the lens can be secured without inhibiting the tear flow beneath the lens.

Although the location of the lens can be achieved with one single lug or flange, it may be advantageous to provide the lens with two opposing lugs or four lugs so as to balance the lens and thus avoid any strain on the lens due to movement of the head, and at the same time to engage more than one depression formed between the ocular muscles. It is, however, possible also to provide the lens with three lugs or flanges which may facilitate the proper location of the lens on the cornea.

The particular shape of the lugs or flanges can be determined in each case by the use of clinical trail lenses constructed with various radii of curvature for the scleral lugs or flanges.

Several embodiments of the invention will be described in detail hereinafter in connection with the drawings in which.

Figure 1:
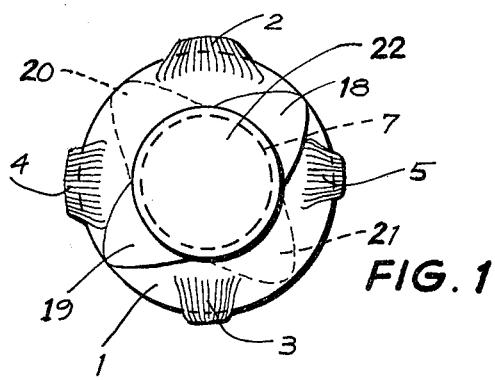
FIG. 1 shows schematically an eyeball with muscles attached thereto and the positioning of a lens according to the invention in relation to these muscles.

In FIG. 1 the eyeball of its sclera is shown schematically supported by its four ocular rectus muscles namely the superior muscle 2, the inferior muscle 3 attached to the eyeball 1 in vertical opposition and the lateral or nasal muscle 4 and the medial or temporal muscle 5 attached to the eyeball 1 in horizontal opposition embedded in the sclera.

A corneal contact lens is positioned on the cornea 7 of the eye and is located by lugs 18 and 19. Lugs 18 and 19 each have a limited dimension around the circumference of the lens to fit only into depressions between the rectus muscles 2 and 5 and 3 and 4 respectively as illustrated in FIG. 1. Although generally two lugs will be sufficient to locate the corneal lens on the eyeball, any other number of lugs, for example four lugs, can be employed as indicated by the additional lugs 20 and 21 shown in dotted lines in FIG. 1. As shown in the drawing, the lens has a substantially circular optical correction zone 22 which has a diameter which substantially matches the diameter of the cornea 7 of the eye of the wearer.

Figures 2A, 2B:
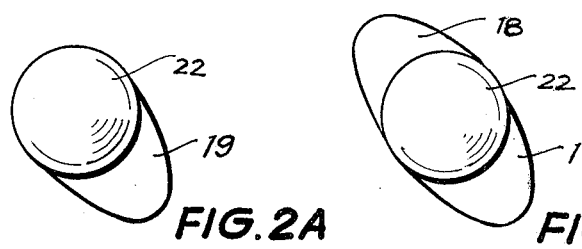
FIG. 2 shows under A, B, C and D various forms of a corneal lens according to the invention.

In FIG. 2 various preferred forms of the corneal lens according to the invention are shown. FIG. 2A shows a lens with a central optical correction zone 22 and a single flange 19. FIG. 2B shows a double flanged lens having oppositely arranged flanges 18 and 19, as in FIG. 1.

Figures 2C, 2D:
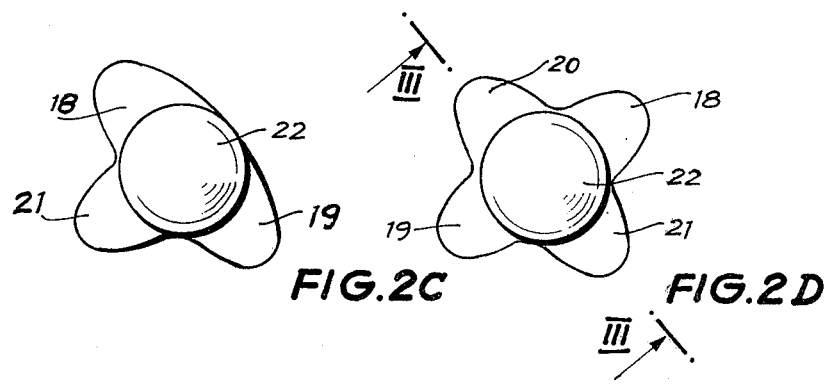

In some cases a triple flanged lens with flanges 18, 19 and 21 may be required as shown in FIG. 2C. To achieve a completely balanced lens arrangement the four-lug arrangement as shown in FIG. 2D can be used whereby the lugs 18, 19, 20 and 21 attached to the optical correction zone 22 fit into the depressions in the sclera as shown in FIG. 1.

Figure 3:
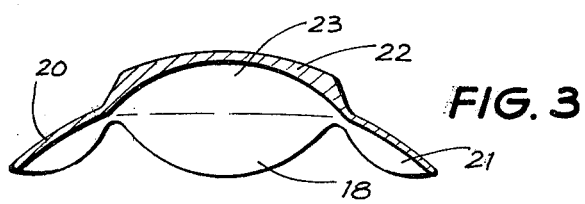
FIG. 3 shows a cross-section of the lens shown in FIG. 2D along line III—III.

A cross-section through the lens arrangement of FIG. 2D is shown in FIG. 3. The central optical correction zone 22 covers the corneal zone 23, while the lugs 18, 20 and 21 (lug 19 not being shown in this cross-section) are adapted to contact the depressions in the sclera as explained above.

The dimensions of the central optical correction zone 22 and the flange or flanges 18 and 21 are selected according to the ocular shape of the sclera, corneal curvature/s and corneal diameter.

The power of the central optic zone 22 is determined by accepted professional procedures for power and axis of cylinder.

The parameters of the lens once determined either by calculation or trial lens fitting may be generated by conventional lathing and polishing or moulding of the lens plastic to the required shape and dimensions.

The lens design permits the selection of a range of basic lens parameters which covers the majority of eyes requiring this type of amptropic correction. An example of a fitting set would be:

| | ABBREVIATIONS |
|---|---|
| BASE CURVE OPTIC RADIUS | BCOR |
| RADIUS SCLERAL FLANGE | RSF |
| DIAMETER OF OPTIC ZONE | DO |
| FLANGE WIDTH | STANDARD 3 MM. |

| BCOR | DO | RSF |
|---|---|---|
| 7.8 | 13.0 | 12.0 |
| 7.8 | 13.5 | 12.0 |
| 8.1 | 13.5 | 12.0 |
| 8.1 | 14.0 | 12.5 |
| 8.1 | 14.5 | 13.0 |
| 8.4 | 13.5 | 12.0 |
| 8.4 | 14.0 | 12.5 |
| 8.4 | 14.5 | 12.5 |
| 8.7 | 14.0 | 12.5 |
| 8.7 | 14.5 | 13.0 |

The size of the fitting set is limited only by the number of lenses and variations in parameters desired. From the above dimensions, it is quite clear that the flange width, the radial width measured from the periphery of the correction zone, which is standard three millimeters, is substantially less than the radius of the correction zone, since the diameter of the correction (optic) zone ranges from 13 to 14.5 millimeters. From these dimensions, it is apparent that the radial width of the flanges, as depicted in the drawings, is exaggerated somewhat in relation to the depicted size of the optic zone in order to promote greater clarity in the understanding of the invention.

The foregoing detailed description of some forms of the invention is not to be considered as limiting the invention to the particular examples. It must be understood that variations can be made without departing from the scope of the invention.

I claim:

1. A soft hydrophilic plastic corneal contact lens consisting essentially of a substantially circular optical correction zone which is shaped for the correction of astigmatism, said lens being soft enough to tend to conform to the shape of the cornea when placed on an eye with corneal astigmatism, at least one discrete lug or flange extending from the periphery of said correction zone, said lug being composed of said soft hydrophilic plastic, said lug having a radial width measured from the periphery of said correction zone which is less than the radius of said correction zone, said lug having a limited dimension around the circumference of the lens to engage only that portion of the sclera of the eye adjacent to the cornea at one of the depressions on the eyeball formed between the four rectus muscles attached to the sclera of the eye to thereby prevent rotation of the lens to maintain the required astigmatism correction.

2. A corneal lens according to claim 1 having at least two and no more than four lugs or flanges, at least two of said lugs or flanges being arranged on diametrically opposite sides of the optical correction zone, each of said lugs being adapted to engage the sclera of the eye adjacent to the cornea at one of the depressions on the eyeball formed between the four rectus muscles attached to the sclera of the eye to thereby prevent rotation of the lens to maintain the required astigmatism correction.

3. A corneal lens as claimed in claim 2 having four lugs substantially equally spaced around the periphery of said correction zone.

4. A method for maintaining the rotational orientation of a soft hydrophilic corneal contact lens having a substantially circular optical correction zone shaped for the correction of astigmatism, comprising providing at least one discreet flange extending from the periphery of the correction zone and having a radial width measured from the periphery of the correction zone which is less than the radius of the correction zone, and inserting the lens into the eye of the wearer with the circular optical correction zone substantially covering the cornea of the wearer and with the flange engaging the sclera of the eye adjacent to the cornea at one of the depressions on the eyeball formed between two of the four rectus muscles attached to the sclera of the eye, the flange having a limited dimension around the circumference of the lens to engage only that portion of the sclera at the depression on the eyeball between the two rectus muscles so that the flange is retained within the depression to prevent rotation of the lens.

* * * * *